Jan. 16, 1962     A. SHANOK ET AL     3,016,590
DECORATIVE TRIM STRIP ASSEMBLY
Filed Dec. 18, 1957     2 Sheets-Sheet 1
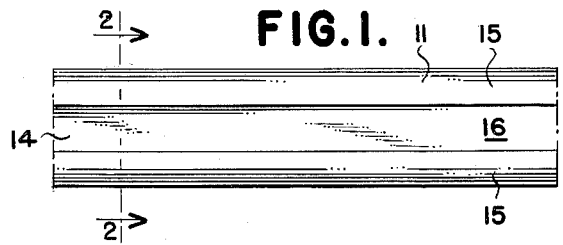
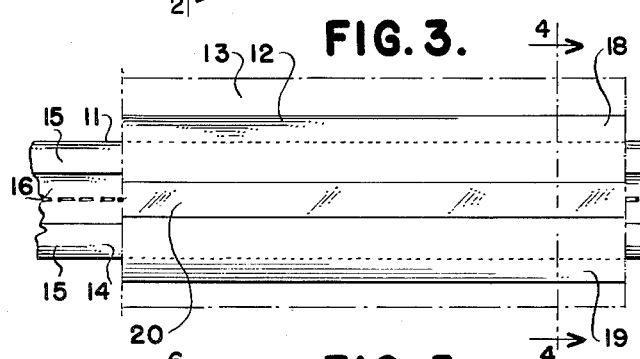
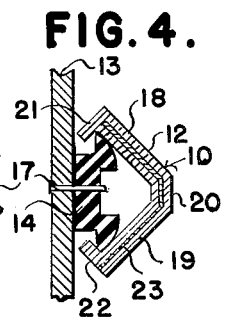
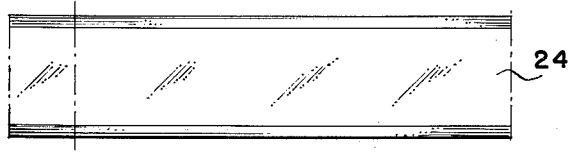
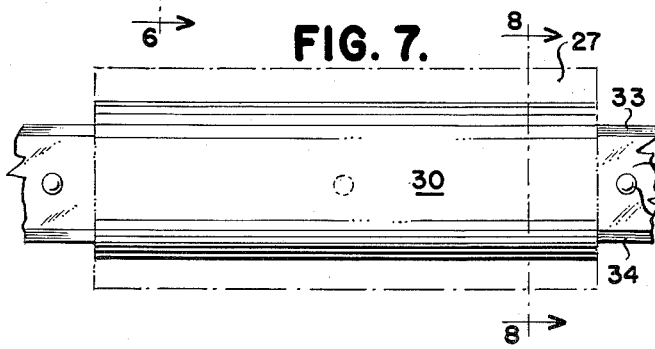
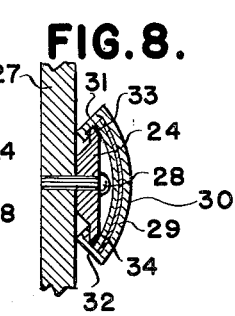
ABRAHAM SHANOK
VICTOR SHANOK
JESSE P. SHANOK
*INVENTORS*
BY Abraham Friedman
Atty.

Jan. 16, 1962 A. SHANOK ETAL 3,016,590
DECORATIVE TRIM STRIP ASSEMBLY
Filed Dec. 18, 1957 2 Sheets-Sheet 2

ABRAHAM SHANOK
VICTOR SHANOK
JESSE P. SHANOK
INVENTORS

BY Abraham Friedman
Atty.

United States Patent Office 3,016,590
Patented Jan. 16, 1962

3,016,590
DECORATIVE TRIM STRIP ASSEMBLY
Abraham Shanok, Victor Shanok, and Jesse P. Shanok, all of 863 65th St., Brooklyn, N.Y.
Filed Dec. 18, 1957, Ser. No. 703,592
1 Claim. (Cl. 24—73)

This invention relates to a decorative trim strip assembly particularly adaptable for mounting upon a plane, arcuate or similar surface.

It is a primary object of this invention to provide a decorative molding or trim strip assembly which can be readily and securely mounted upon a surface, such as for example, the walls of an article of luggage and which will blend pleasingly with the surrounding supporting structure without exposing the fastening means whereby it is secured thereto to view.

Another inventive object is to provide a decorative trim assembly capable of being fabricated by an extrusion process and providing strips of any desired length, said strip being longitudinally flexible and transversely resilient whereby the trim assembly is capable of readily assuming the contours of the supporting surface and of being temporarily deformed in a direction normal to the longitudinal for grasping the complementary strip member of the assembly.

A further inventive object involves the provision of a decorative trim strip assembly which can be fabricated by an extrusion process in elongated flexible strips of any desired length and wherein the assembly comprises a pair of complementary strip members at least one of which may be transversely deformed to resiliently grasp a portion of the mating or complementary strip member thus completing the assembly.

A still further inventive object comprises the provision of a decorative trim strip assembly formed of a pair of mating longitudinally flexible strip members one of said strip members acting as a base for securement to a supporting surface and the other of said strip members comprising a cap overlying said strip and obscuring it substantially if not completely from view.

Further objects, benefits and advantages of this invention will become apparent from the description thereof contained in the annexed drawings, specifications and claims or as will otherwise become obvious. It will be understood that the invention herein disclosed may be employed for other purposes for which the parts, structure and arrangement are adapted.

In the accompanying drawings:

FIGURE 1 is a plan view of one form of base member comprising the decorative trim strip assembly of the present invention;

FIGURE 2 is a cross section of FIGURE 1 taken along line 2—2 thereof;

FIGURE 3 is a plan view of a fragment of the trim strip assembly partly broken away to show the base member attached to a supporting surface;

FIGURE 4 is a cross section of FIGURE 3 taken along line 4—4 thereof;

FIGURE 5 is a plan view of another form of base member of the trim strip assembly;

FIGURE 6 is a cross section of FIGURE 5 taken along line 6—6 thereof;

FIGURE 7 is a plan view of a fragment of another form of trim strip assembly partly broken away to show the base member attached to a supporting surface;

FIGURE 8 is a cross section of FIGURE 7 taken along line 8—8 thereof;

FIGURE 9 is a fragmentary view showing the trim strip assembly as applied around a right angle bend, as for example, the corner of an article of luggage;

Figure 10:
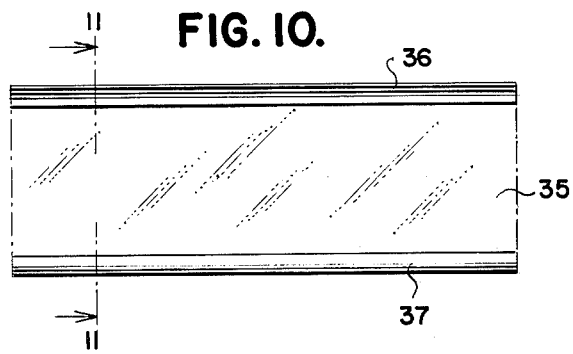
FIGURE 10 is a plan view of still another form of base member.
Figure 11:
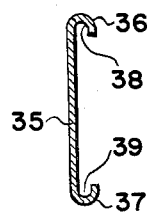
FIGURE 11 is a cross section of FIGURE 10 taken along line 11—11 thereof.
Figure 12:
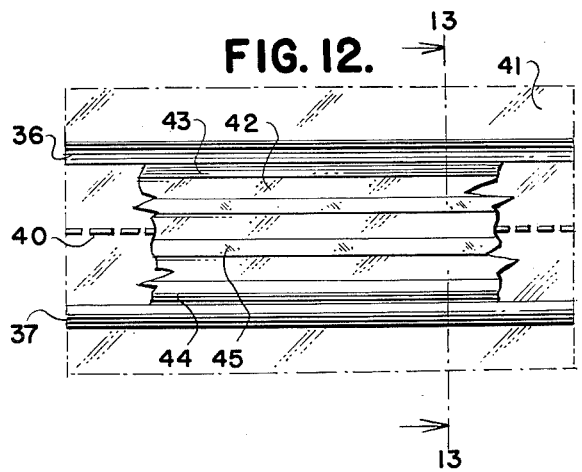
FIGURE 12 is a fragmentary view of a trim strip assembly utilizing the base member of FIGURE 10 and partly broken away to show the mode of attachment of the base member.
Figure 13:
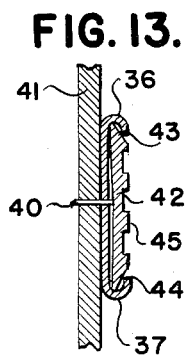
FIGURE 13 is a cross section of FIGURE 12 taken along line 13—13 thereof.

As may be seen in FIGURES 1, 2, 3 and 4, the decorative trim strip assembly designated generally by the numeral 10 comprises a base strip 11 which is surmounted by a cap member 12. The assembly is mounted upon any suitable surface, such as for example, the wall surface 13 of an article of luggage or the like. The base strip 11 of the assembly comprises an elongated strip of longitudinally flexible material and may advantageously be formed by an extrusion process of plastic, elastomeric or rubber like materials. Thus the base strip 11 may be extruded of rubber, polyethylene or plastisized polyvinyl chloride resin. The base strip 11 comprises a body portion 14 which is advantageously formed in concavo-convex cross section having longitudinally extending laterally disposed mounting flanges 15. The spaced flanges 15 define a channel 16 therebetween along the outer surface of the base strip. The base strip 11 is applied to a supporting surface by placing the inner surface thereof in contact with said supporting surface and thereupon applying suitable fastening means to retain it in position thereon. In the case of luggage, which is formed of a relatively thin wall of wood, cardboard, leather or similar material, it has been found advantageous to apply the base strip by stitching the parts together through the body of the supporting surface material as shown at 17. It will be noted that the stitching is applied through the channel 16 of the base strip and the channel 16 acts as a guide for the stitching machine so as to assure the proper disposition of the stitches along the base strip. It should be noted, as may be more clearly seen in FIGURE 4, that the stitching draws the arcuate body portion 14 of the base strip into planar contacting engagement with the supporting surface and thereby assures a more stable and secure connection. It should be also understood that other conventional connection means such as nails, tacks, adhesives, etc. can be employed to secure base strip 11 to the supporting material.

One form of decorative trim contemplated as shown in FIGURE 4, comprises the cap member 12 formed by extrusion into longitudinal strips having sloping symmetrical sides 18 and 19 joined by an outermost planar surface 20 which is parallel to the surface of the supporting material 17. A pair of inwardly turned edges 21 and 22 extend from sides 18 and 19 approximately at right angles thereto defining V-shaped channels to receive the flanges 15 of base strip 11.

Cap member 12 is preferably formed from this flexible translucent plastic having tinfoil strips 23 embedded therein for aesthetic purposes. The flexibility of the cap member makes it a simple process to mount it on the base 11 with flanges 15 forced into the V-shaped channels formed by the edges 21 and 22 regardless of the curvature of base 11. When so mounted, base 11 is obscured and only the decorative effect provided by the cap member 12 can be seen. The sides 21 and 22 may be extended so that they contact the supporting surface 13. Due to the flexible nature of the flanges 15 transverse forces tending to dislodge the trim are better resisted and the process of mounting the cap thereon is facilitated. Should portions of cap member 12 become worn or damaged, replacement is simple and can be effected by unskilled persons.

In FIGURES 5, 6, 7 and 8 another form of the invention is shown comprising a base strip 24 having a concave inner surface 25 and a planar outer surface 26. Base strip 24 is secured to a relatively thick supporting material 27 by means of tacks 28 placed at intervals. A cap member 29 is employed which has an outer arcuate surface 30 and a symmetrical pair of edges 31 and 32 which extend radially inward. The base strip 24 includes a central thickened portion and thin edges 33 and 34 which are spaced from the surface of the supporting material 27 whereby cap member edges 31 and 32 can be inserted to grasp the edges 33 and 34 respectively. The materials from which the base and cap member are fabricated is similar to the corresponding elements in FIGURES 3 and 4.

The modification of FIGURES 5 thru 8 is particularly useful when the material 17 is so constituted as to necessitate recourse to tacks or nails as securing means.

In FIGURES 10 thru 13 another form of the invention is illustrated in which a channel shaped base member is employed comprising a planar surfaced web portion 35 and inwardly turned arcuate sides 36 and 37 providing longitudinally extending slots 38 and 39 respectively. The base member is illustrated as secured by stitching 40 along a longitudinal axis to a supporting material 41. Other suitable forms of securement may, of course, be employed. An outer trim strip 42 is mounted on the base member with the edges 43 and 44 within the slots 38 and 39 respectively. Strip 42 is formed by an extrusion process from plastic material similar to cap members 29 and 12. Due to the flexible construction of strip 42, it is mounted in slots 38 and 39 by deformation about a longitudinal axis and after the strip 42 has been inserted in the arcuate sides 36 and 37, it reassumes the planar natural shape shown in FIGURE 13 whereby edges 43 and 44 snugly engage sides 36 and 37 respectively. Outer ridges 45 are provided both for aesthetic purposes and to help the operator in securing a better grip in mounting the strip in the base member. In this form of the invention the arcuate sides 36 and 37 remain visible and may contrast in color with the strip 42 for an enhanced aesthetic effect. The cap or outer strip is formed of an opaque material and thus obscures the portion of the base strip to which the fastening means are secured.

Figure 14:
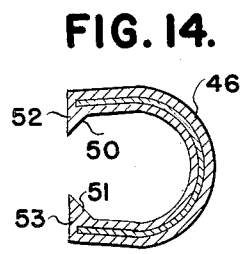
FIGURE 14 is a cross sectional view of a further form of trim strip cap member.
Figure 15:
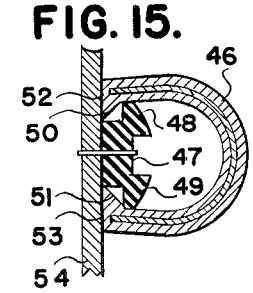
FIGURE 15 is a cross sectional view of the cap member shown in FIGURE 14 as engaged with the base member shown in FIGURE 2.

The modified construction shown in FIGURES 14 and 15 is the same as the form described in connection with FIGURES 1 thru 4 except that the horse shoe cap member 46 replaces the cap member 12 previously described. The base member 47 includes flexible mounting flanges 48 and 49 about which the cap member 46 is mounted by means of inwardly projecting prongs 50 and 51. Additional stability to the connection is provided by the flat terminal surfaces 52 and 53 of the prongs which engage the outer surface of the supporting material 54. By virtue of such engagement the base member 47 is completely obscured and enclosed whereby no foreign matter can gain access between the cap and base members. As in the previously described modifications, the resiliency and flexibility of cap and base members of FIGURES 14 and 15 permit the cap member to be easily mounted on or removed from the base member regardless of the curvature of the base member.

From the foregoing detailed description it is now apparent that a decorative trim is provided comprising components which can be economically fabricated by extrusion processes and which can be readily mounted by stitching, stapling, nailing, etc. on various supporting materials such as, leather, cardboard, plastic, etc. accurately along predetermined curved or linear outlines to provide a desired aesthetic effect. Moreover the channels formed in the base members of FIGURES 4, 13 and 15 function as guides in accurately entering the means used to attach the base member to the supporting materials.

The base strip being longitudinally flexible permits the strip to follow the curvature of the surface to which it is applied and the cap or outer strip similarly follows these contours when it is applied to the base strip. Thus, in FIGURE 9, the assembly 10 is shown as applied around a corner of a supporting surface 55.

Having described in detail the nature of this invention, a patent is desired for the novel features as defined in the following claim:

A base strip for a decorative trim formed of elongated flexible material adapted to be mounted on a supporting material by connection means transverse to the supporting material along a predetermined longitudinal axis, comprising a central portion adapted to engage the supporting material along a planar interface, said portion having an inner surface of arcuate contour which, when secured to the supporting material, flexes about the said axis to form a planar surface, and laterally extending flanges symmetrical about the axis, said flanges being adapted to engage coacting means of a decorative cap member to be mounted over the strip to provide an interlocking removable connection therebetween, said flanges also defining a longitudinal trough therebetween which functions as a guide in applying the connection means accurately along the said axis.

References Cited in the file of this patent

UNITED STATES PATENTS

| | | |
|---|---|---|
| 1,863,633 | Melind | June 21, 1932 |
| 2,287,606 | Eady | June 23, 1942 |
| 2,319,723 | Crowe | May 18, 1943 |
| 2,681,716 | Black | June 22, 1954 |